United States Patent

[11] 3,571,934

[72] Inventor Ernest J. Buck, Sr.
Pasadena, Calif.
[21] Appl. No. 739,226
[22] Filed June 24, 1968
[45] Patented Mar. 23, 1971
[73] Assignee Lockheed Aircraft Corporation
Burbank, Calif.

[54] THREE-AXIS INSPECTION PROBE
15 Claims, 7 Drawing Figs.
[52] U.S. Cl. .................................................. 33/174,
33/169, 33/172
[51] Int. Cl. .............................................. G01b 7/28
[50] Field of Search ........................................ 33/169,
172, 23 (K), (H); 90/62; 251/3

[56] References Cited
UNITED STATES PATENTS
2,225,717  12/1940  Shaw ........................... 90/62
2,911,727  11/1959  Steinhart ..................... 33/169C
3,121,370  2/1964   Larsen ......................... 90/62
3,141,379  7/1964   Schlapp et al. ............... 90/62
3,250,012  5/1966   Hilton et al. ................. 33/172(E)

FOREIGN PATENTS
678,777   1/1964   Canada ........................ 33/23K

Primary Examiner—Harry N. Haroian
Attorneys—George C. Sullivan and Ralph M. Flygare ABSTRACT: An inspection probe for use in conjunction with numerically controlled machine tools is disclosed which measures deviations, at specified inspection points, from predetermined numerical dimensions along $x$, $y$ or $z$ axes in accordance with a predetermined taped program. The probe incorporates mechanical means for inhibiting $x$ and $y$ axis deflections while making $z$ axis measurements, and conversely. The output may be continuously recorded by means of a pneumatic or an electrical strip chart recorder.

PATENTED MAR 23 1971

INVENTOR.
ERNEST J. BUCK, SR.
BY
Agents

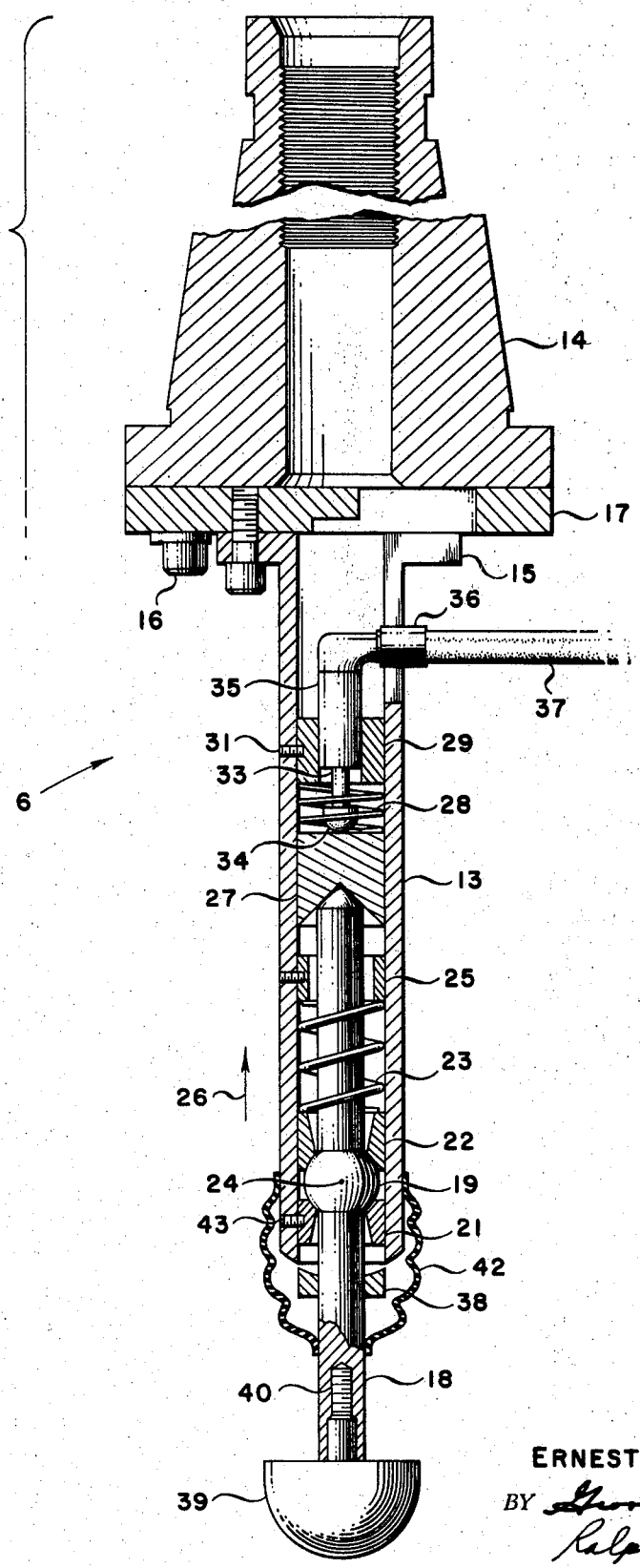

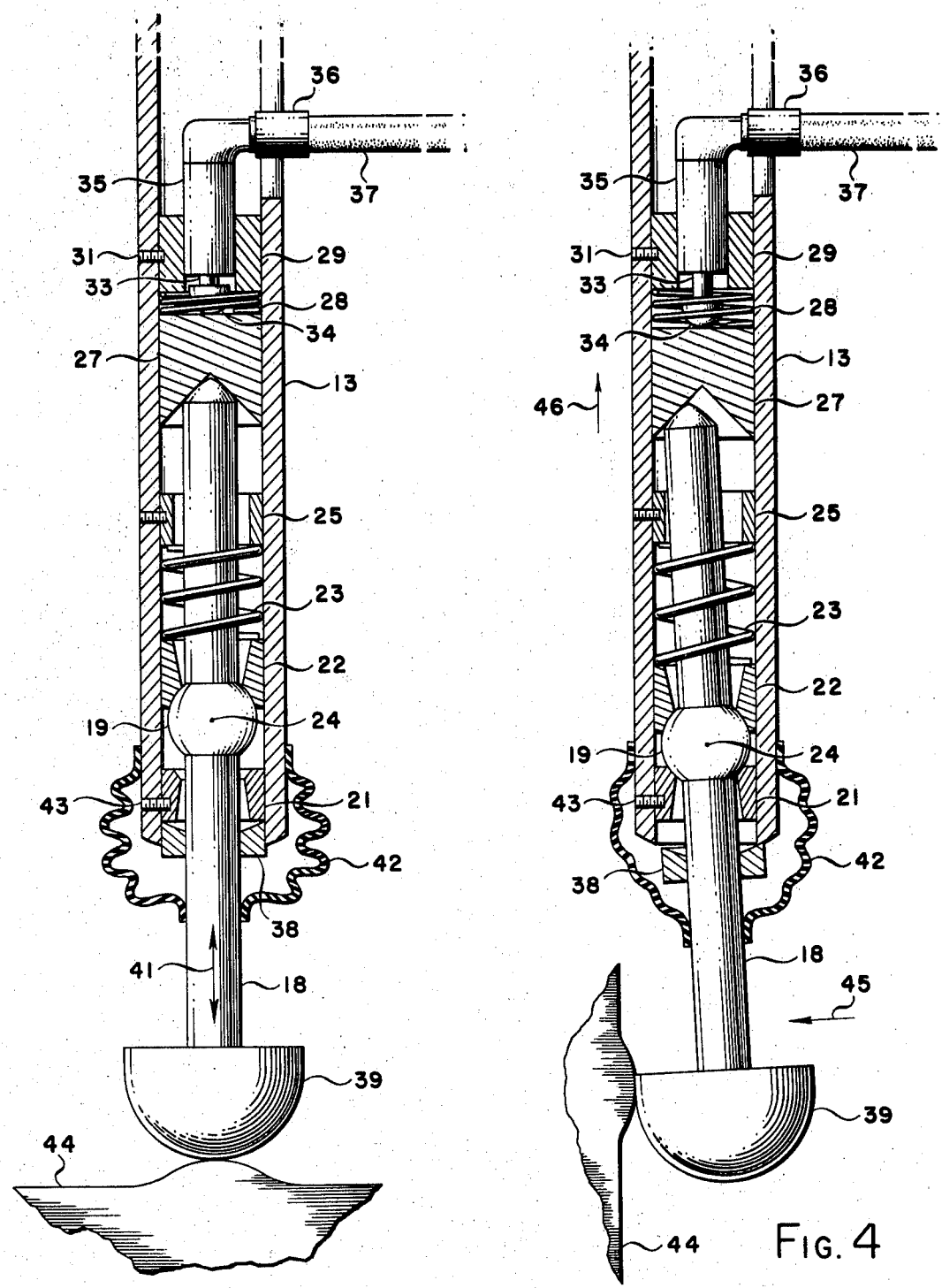

INVENTOR.
ERNEST J. BUCK, SR.

THREE-AXIS INSPECTION PROBE

BACKGROUND OF THE INVENTION

The increasing use of numerically controlled machines for the fabrication of machine parts has outdistanced the ability to inspect the machine parts using conventional surface plate methods. Quality assurance requires that the parts be inspected in all planes and large parts must be inspected by deep throated micrometers, dial indicators and other devices having special extensions which often require more than one person to complete the measurement. Such methods of inspection not only result in a great disparity between the time required to manufacture the part and the time required for inspecting it, but also do not provide a permanent record of the points inspected. Techniques have been suggested heretofore to accomplish the desired inspections by automatic means. One such technique is disclosed in U.S. Pat. No. 3,250,012 entitled "Inspection Device and Method" of common assignee with the present application. While the inspection probe described in the mentioned patent as been found to be a significant advance in the state-of-the-art, it has certain limitations which are overcome by the present invention. Specifically, the prior device is capable of making dimensional measurements at numerical locations defined by $x$ and $y$ coordinates, but requires special procedures to also make measurements along the $z$ axis coordinate.

SUMMARY OF THE INVENTION

The present invention comprises an inspection probe for use in a numerically-controlled machine which provides a signal output which may be interpreted as having been obtained by approaching the inspection point from either the $x$, $y$ or $z$ axis. The invention overcomes the above-mentioned limitations of prior devices since it provides a 1:1 correspondence between measurements in all axes and includes novel means for mechanically locking out $x$ and $y$ axis deflections whenever $z$ axis measurements are being made. Conversely, the probe is inhibited from deflecting in the $x$ and $y$ directions during the $z$-axis mode. The mode of operation is determined by the direction of approach of the probe to the workpiece at the time of contact. Switching or scale shifting is avoided since the output for a given deflection is equal in all measuring modes. Furthermore, the ability to lockout the $x$ and $y$ modes, during $z$ axis measurement, permits reliable measurements to be made without the necessity of having a dwell period to permit measurement.

The apparatus of the invention greatly reduces the time required to perform three-axis inspections. Other advantages of the present invention are its improved linearity, accuracy, and flexibility. The uniformity of scale in all axes obviates limit switches or multiple recording channels as is required in certain prior inspection probe devices.

It is therefore an object of the invention to provide a novel and improved three-axis probe device for the inspection of manufactured parts in a numerically controlled machine.

Another object of the invention is to provide a novel and improved method for the automatic inspection of manufactured parts.

Yet another object of the invention is to provide a novel and improved inspection probe which may be mounted at the spindle of a numerically controlled machine which has been programmed with an inspection tape, to make independent measurements of a part along $x$, $y$ and $z$ axes and automatically indicate or record the measured dimensions.

Still another object of the invention is to provide a novel and improved method and apparatus for rapid inspection of manufactured parts on a numerically controlled machine wherein a three-axis inspection probe is automatically positioned with respect to a series of predetermined inspection points and which transmits signals to an indicating recorder to provide a quantitative record of the deviations from predetermined numerical dimensions at the inspection points.

It is yet another object of the invention to provide a novel and improved three-axis inspection probe for numerically controlled machines, having a novel lockout mechanism for precluding $x$ and $y$ deflections of the probe during the $z$ axis measurement mode.

Another object of the invention is to provide novel and improved inspection apparatus having greater flexibility than similar devices employed heretofore to accomplish generally similar purposes.

These and other objects of the invention will be better understood by making reference to the following description and the accompanying drawings.

BRIEF DESCRIPTION OF THE DRAWINGS

FIG. 2 is a cross-sectional elevation view of a preferred embodiment of an inspection probe constructed in accordance with the invention.

FIG. 3 is a schematic view of the apparatus of FIG. 2 showing the apparatus in the $z$-axis operating mode.

FIG. 4 is a view similar to FIG. 3 showing the apparatus in the $x$–$y$ axis operating mode.

DESCRIPTION OF THE PREFERRED EMBODIMENTS

Figure 1:
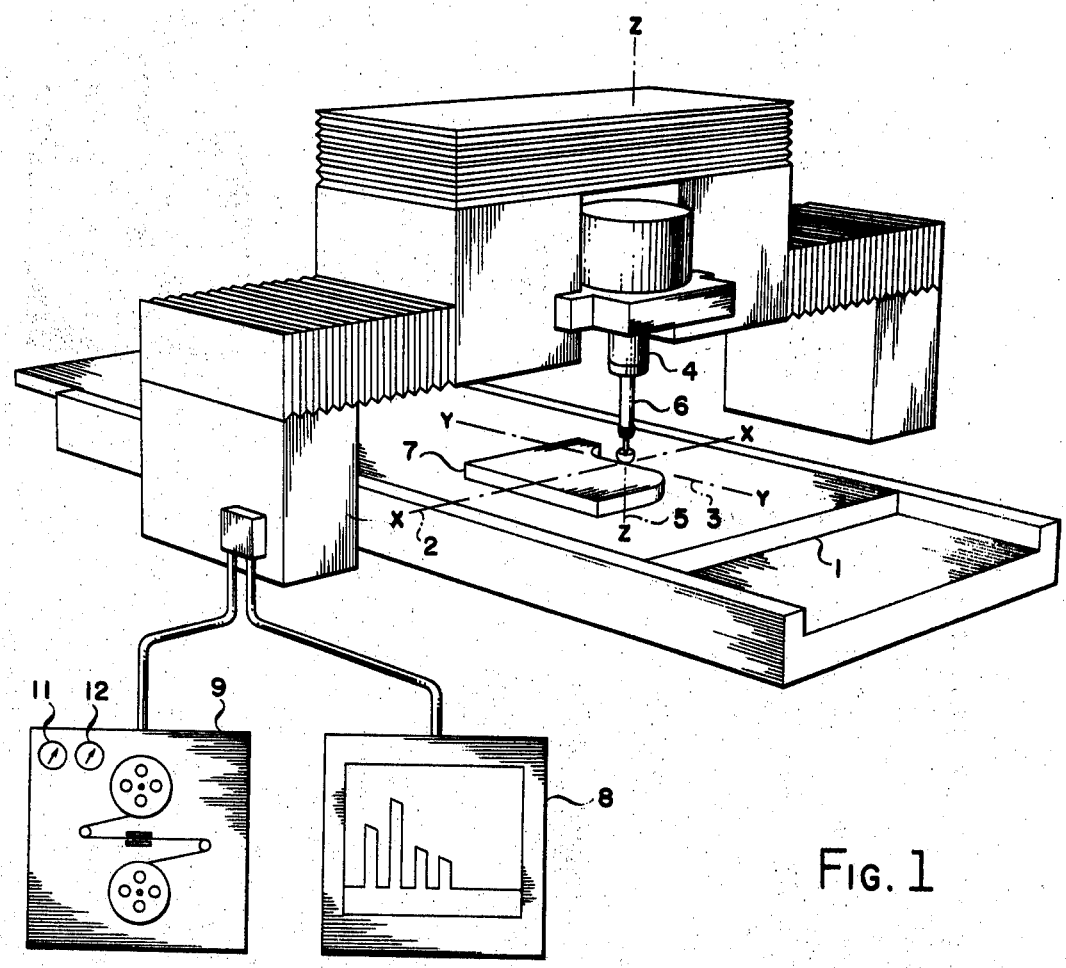
FIG. 1 is a perspective view showing, in somewhat simplified form, the general arrangement of a numerically controlled machine system incorporating the inspection device of the invention.

Referring to FIG. 1 there is shown a numerically controlled bridgemill of a type suited for use with the present invention. The machine is provided with a table 1 which is rectilinearly movable along orthogonal $x$ and $y$ coordinate axes, 2 and 3 respectively. The machine is further provided with a movable spindle 4 which is adapted to be rectilinearly moved along the $z$ coordinate axis 5 in accordance with a predetermined tape-controlled program. Machining of the part 7 to be fabricated is accomplished with a rotating cutting tool (not shown) which is carried in the spindle 4 as will be readily understood by those versed in the art. Upon completion of the machining of part 7 the cutter is replaced with the probe device 6 of the present invention and, in a manner to be described hereinafter, measures the machine part 7 at a plurality of predetermined inspection points to verify its dimensions. Of course, the spindle 4 is not caused to rotate during the inspection mode of operation. Dimensions sensed by the probe 6 are transmitted in the form of an electric or pneumatic signal to a recorder 8 where they may be recorded. Also, optional gauges 11 and 12 provide the operator with a visual indication of any deviation from the nominal dimension. The machine is provided with suitable drive mechanisms for relatively moving the part 7 and the spindle 4 and the probe 6 along three orthogonal axes 2, 3 and 5 in accordance with a predetermined program obtained from the tape reader 9. Reference may be made to the previously-mentioned U.S. Pat. No. 3,250,012 for additional details of the numerically controlled machine and its tape reader. The $x$ and $y$ axis measurements are made independently of $z$ axis conditions and conversely, $z$ axis measurements are made independently of $x$ and $y$ axis conditions. The axis of measurement is selected automatically by the direction of approach to the part 7, thus eliminating special switching on the part of the operator or the machine. While locked in the $z$ axis, a plane may be continuously traversed and measured if desired, as opposed to discrete point measuring. Also, a machined wall may be traversed vertically while the probe is locked in the x and y axes to provide a continuous output record.

As will be seen from the foregoing description, the same machine may be used to make the part and to inspect the part, thus obviating the use of a separate inspection machine of the types used in the prior art.

Referring to FIG. 2, the probe device 6 comprises a hollow cylindrical housing 13 the upper end of which is secured to a conical shank 14 having a standard taper adapted to engage the collet of the machine tool spindle 4 (shown in FIG. 1). While the arbor or shank 14 shown is of a conical configuration, other shapes adapted to engage the spindle 4 may be substituted, in a well-known manner.

The upper end of housing 13 is provided with a circular mounting flange 15. Bolts or other suitable fastening means, one of which is indicated at 16, are used to secure the housing 13 to the flange 15 and to shank 14 via adapter plate 17. A stylus shaft 18 having a central spherical bearing 19 is movably supported by means of fixed and movable bearing seats, 21 and 22 respectively, which are in turn contained within the housing 13.

The lower end of the shaft 18 is provided with a detachable probe contact 39 which is adapted to contact the part to be inspected. The threaded fastener portion 40 and the mating tapped hole in the lower end of the shaft 18, permit the probe contact 39 to be readily removed or replaced. While the configuration and dimensions of the contact 39 and the length of the shaft 18 are dictated by the configuration and size of the part 7 to be inspected, in a typical construction they may be dimensioned to have a 1:1 correspondence when reading horizontal dimensions as against vertical dimensions. In a preferred embodiment, the contact 39 has a hemispherical shape, thus providing a height identical to its radius and proportioned to the length of the shaft 18, such that the dimensions of the probe can be programmed into the tape at uniform increments for horizontal and vertical deflection. It should be understood that the geometry of the contact element may be other than hemispherical, as dictated by specific applications. The interchangeability of the probe contact 39 permits the adaption of the device to various inspection applications. For example, the contact portion may be modified to permit inspection of narrow slots or other part configurations which would not be compatible with the hemispherical contact shown in the embodiment of FIG. 2.

Fixed bearing seat 21 is secured to the housing 13 by means of set screws 43 whereas the movable bearing seat 22 is slidably supported therein. Movable seat spring 23 is partially compressed between the cylindrical spring retainer 25 and the upper end of the movable bearing seat 22. The spring retainer 25 is secured to the interior wall of the housing 13. As can be seen, the spring retainer 25 has a central aperture which provides clearance for the upper portion of the stylus shaft 18 to pass through. Seats 21 and 22 have complementary spherical shapes confronting the spherical bearing 19, thus permitting shaft 18 to pivot about point 24. The stylus shaft 18 may also be displaced in the direction of arrow 26 by displacing the movable seat 22 upwardly, thus further compressing the spring 23.

Figure 5:
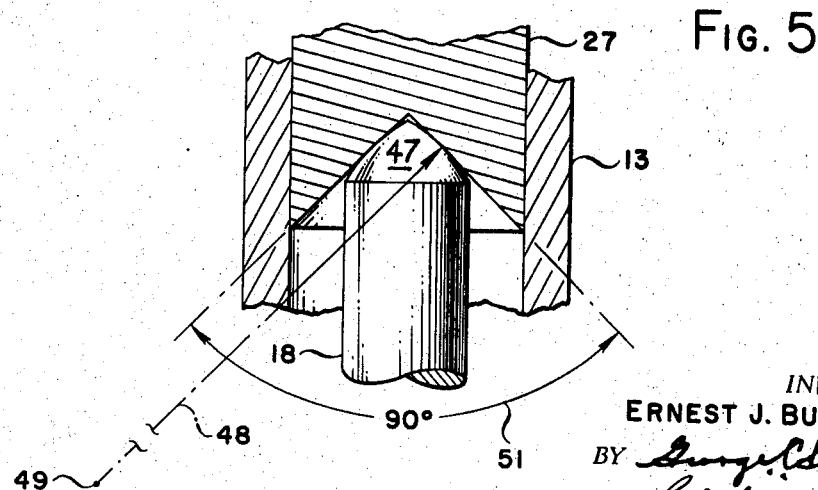
FIG. 5 is a detailed view of the upper end of the stylus shaft illustrating the geometry of its exterior surface.

The upper end of the stylus shaft 18 has a generally rounded contour, the detailed geometry of which will be described more fully hereinafter in connection with the description of FIG. 5. The upper, generally rounded end of shaft 18 is adapted to engage the translation cone 27 which is slidably mounted within the housing 13. A cone support spring 28 has its upper end restrained by retainer 29, and the lower end of the cone support spring 28 is urged into engagement with the upper planar face of the translation cone 27. A pin 31 extending through the wall of the housing 13 and into the retainer 29 secures the retainer 29 against movement. As can be seen, the cone 27 is provided with an axial hole 32 therethrough. The angle of the conical undersurface of translation cone 27 is 90°. A plunger 33 having a hemispherical cam surface 34 engages the upper end of the translation cone 27. The plunger 33 is axially displaceable in the direction of arrow 26 to prove an output from the associated transducer 35.

The movable seat spring 23 asserts sufficient pressure on the movable seat 22 to maintain the spherical bearing 19 firmly seated. Also, the cone support spring 28 has just sufficient force to maintain the translation cone 27 against the upper end of the stylus shaft 18.

In a typical construction the transducer 35 may comprise an air valve which communicates with the tube fitting 36 and thence to an external pneumatic recorder via the flexible tube 37. An aperture is provided in the sidewall of the housing 13 to accommodate fitting 36. As can be seen, the interconnection between the tube fitting 36 and the transducer 35 is provided with a 90° bend to facilitate the external connection. Modulation of the airflow in tube 37 will be recorded on the external recorder.

After a part (e.g., part 7) has been machined by the numerically controlled machine, the cutting tool is removed and the inspection probe device of the invention is installed in its place. An inspection tape is substituted for the cutting control tape, thus permitting the same numerically controlled machine to be used to inspect the part. The probe is initially indexed with respect to a reference location and the recorder is set to zero. Thereafter, the probe, under the control of the taped program, moves sequentially to a given number of inspection points where it is brought into contact with the surface to be measured. The probe may approach the surface to be measured either horizontally or vertically, as desired. Depending upon the direction of approach to the inspection point, the probe will operate in one or the other of two operating modes.

Referring to FIG. 3, there is shown a first operating mode of the apparatus in which the stylus shaft 18 is vertically displaced along the z-axis 41. The mode lockout ring 38, which is secured to the stylus shaft 18, has an upper curved face of complimentary symmetry with respect to the lower curved face of the housing 13. When the stylus contact 39 is displaced arcuately, the small clearance between the confronting curved faces of the housing 13 and mode lockout ring 38, typically of the order of 0.001 inch, will permit the lockout ring 38 to clear the housing 13 as shown in FIG. 3. However, when the shaft 18 is displaced along the z-axis 41, commencing from a free or unlocked condition, the mode lockout ring 38 will move into the housing 13 and thereafter prevent arcuate movement about point 24 until the shaft 18 is restored to its fully extended (unlocked) position. Movement of the stylus shaft 18 along the z-axis 41 will cause the spherical bearing 19 to displace the movable bearing seat 22 in the direction of the arrow 26 and apply a compressive force to spring 23.

As the contact 39 clears the elevated contour of part 42 which resulted in the z-axis displacement, the spring 23 will urge the movable bearing seat 22 downwardly and apply a restoring force to the stylus shaft 18 via the bearing seat 22.

Once the measurement has been made, the probe is programmed to move away from the part causing the stylus to be restored to its normal or reset position.

A flexible rubber boot 42 encloses the lower end of housing 13 and mode lockout ring 38. The upper end of the boot 42 is secured to the housing 13 and the lower end is secured to shaft 18. This arrangement prevents foreign matter from entering the device and interfering with the close-tolerance parts.

The second operating mode is illustrated in FIG. 4 wherein the contact 39 has laterally approached the part 44 in the direction of arrow 45; this corresponds to movement in the horizontal plane towards an inspection point defined by x and y coordinates. As the contact 39 is deflected by its engagement with the surface of part 44, while the probe is moving in the direction of arrow 45, shaft 18 will be caused to pivot about point 24. The upper end of shaft 18 will move through an arcuate path thereby causing cone 27 to be translated upwardly in the direction of arrow 46. Shaft 18 does not move upwardly when it is arcuately displaced. Also, the mode lockout ring 38 moves to a position where it extends beyond the lower peripheral edge of housing 13. This prevents shaft 18 from being upwardly displaced in the direction of arrow 46 since any tendency of the ring 38 to move upwardly will result in its engagement with the housing 13 and thereby prevent further displacement in the vertical direction. Once the shaft 18 has been restored to its initial unlocked position, the mode lockout ring 38 will clear the housing 13 and the probe may be programmed to make either another x-y axis measurement or move to a z-axis measurement.

Summarizing x or y axis displacement results in arcuate motion of the spherical bearing 19 about point 24 which will cause the upper end of the stylus 18 to apply an upwardly directed force to the translation cone 27. This action will, in turn, upwardly displace the plunger 33 and produce an output signal from transducer 35.

A z-axis displacement of the shaft 18 will be translated directly through the cone 27 along its central axis to the transducer plunger 33. Thus, the transducer plunger 33 will always be displaced in response to a rectilinear motion of the cone 27 even though the driving force to the cone 27 may result from either a direct axial translation or a vector component derived from the arcuate motion of the shaft 18. The objective is to make the shaft lengths on either side of pivot point 24 and the cone angles 47 and 51 such that a given displacement in the z axis will displace the translation cone 27 by the same amount as would the given displacement in the x or y axis. The manner in which the output of the transducer is recorded will be described in detail in a subsequent part of this specification.

In order to provide a highly linear displacement of the cone 27 is response to arcuate motion of the stylus shaft 18, a particular geometric configuration of the upper end of the shaft is employed. This can best be seen in FIG. 5 which is a detailed view showing an elevation cross section of the shaft end. If the upper end of the shaft 18 were to have a spherical surface, the pivoting action of the stylus and the resulting rotation of the spherical surface against the 90° interior angle 51 of the translation cone 27 would induce a nonlinear error into the vertical motion of the translation cone 27. Therefore the upper end of the stylus shaft 18 is modified to have a contact surface which more nearly approximates a cone than a sphere. As can be seen, the shaft 18 is provided with a curved semiconical surface 47 generated by a radius 48 originating at point 49. The surface generated thereby compensates for the inherent nonlinearity of the vector component of the arcuate motion of shaft 18 and results in a 1:1 correspondence between the displacement of the contact 39 in either the x or y axis and the rectilinear displacement of the transducer plunger 33. In a practical construction this has been found to reduce nonlinear errors to less than 0.00065 inch in the 0.128 inch maximum arcuate travel of the probe.

Figure 6:
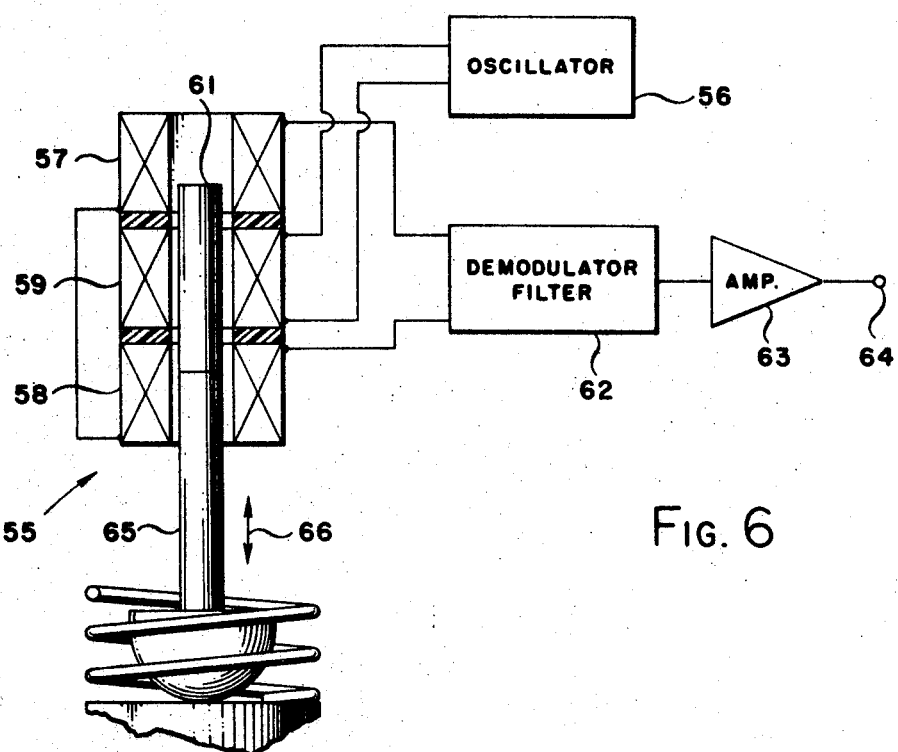
FIG. 6 illustrates an alternative embodiment of the transducer portion of apparatus of the type shown in FIG. 2, wherein an electrical pickoff is employed in lieu of a pneumatic sensor.

FIG. 6 illustrates an alternate embodiment of the apparatus in which an electrical transducer 55 is employed in lieu of the pneumatic transducer 35 shown in FIG. 3 and 4. As will be understood by those versed in the art, a variety of electrical pickup devices may be employed; however, a linear variable differential transformer (LVDT) has been found to be a suitable transducer for this purpose since it produces an electrical output which is proportional to the linear displacement of a movable core. The LVDT comprises a split-coil solenoid (sections 57 and 58) and an interposed excitation coil 59 which is energized with an AC carrier obtained from a fixed frequency oscillator 56. The output of series-connected coil sections 57 and 58 comprises an AC signal, the amplitude of which is a function of the position of a movable magnetic core 61. Coil sections 57 and 58 are wound in opposition and are connected in series; the signal induced therein by displacement of core 61 is supplied to a demodulator-filter 62. A DC analogue output is obtained from the demodulator-filter 62 and is amplified via amplifier 63, and supplied to an electrical indicator, or recorder via terminal 64.

Shaft 65 corresponds in function to shaft 33 in FIGS. 2—4 and it has its upper end connected to the displaceable core 61 in the LVDT. In the normal position of the probe, the core 61 will be centered between the output coils 57—58 and no output will appear at the output terminal 64. Either an upward or downward displacement, as indicated by the arrow 66, will couple the carrier from the excitation coil 59 into the output coils 57—58 and provide a resultant output at the output terminal 64, proportional to the amplitude of the mechanical displacement 66.

Figure 7:
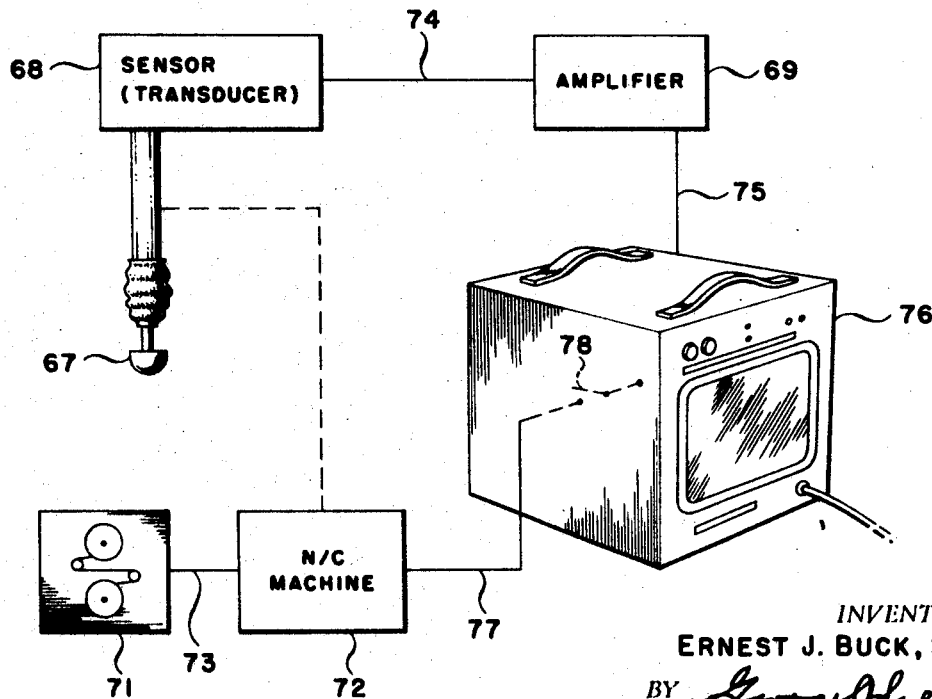
FIG. 7 is a block diagram schematically illustrating the various components of an overall inspection system incorporating the novel probe of the invention.

There is shown in FIG. 7, a block diagram of the system comprising the three-axis probe 67, the sensor or transducer 68, the signal amplifier 69, and the strip chart recorder 70. As has been stated previously, the sensor and record system may comprise either electrical or pneumatic systems and the invention is intended to encompass both species.

The numerical data derived from the tape reader 71 is provided via line 73 to the servo mechanisms which translate the probe carrying spindle of the numerically controlled machine 72. In response to commands from the tape reader 71, the spindle and probe 67 are moved from a reference point to a predetermined inspection point. The probe contact 67 will engage the part to be inspected at the given inspection point. Engagement of the probe contact will result in a displacement of the stylus shaft and a corresponding output will be sent via line 74, amplifier 69 and line 75 to the indicator-recorder 76.

The recorder 76 is provided with a normally-closed limit switch 78 which opens in response to any input corresponding to a displacement in excess of 0.135 inch from the centerline of the probe. Since the drive control of the numerically controlled machine is in series with the limit switch in the recorder 76, via line 77, the probe is prevented from being displaced in excess of 0.135 inch. The arrangement provides a fail-safe feature which will prevent either the part or the probe from being damaged by excessive relative travel therebetween.

Prior to the time that the probe engages the part to be inspected, the recorder will read off scale in the negative direction. The transducer 35 or 55 is adjusted so that the probe contact 39 must be displaced by a given amount before an output signal is obtained. This fixed displacement, referred to as the "offset" is typically 0.060 inch. The 0.060 inch offset requires that the probe actually engage the part to be inspected and thereafter be displaced by the amount of the offset before a zero output signal is obtained. That is, the initial deflection of the contact 39 will measure minus. Furthur deflection will cause the recording pen to pass zero and read plus. This scheme permits detection of undersized parts as well as oversized parts. If the part has exactly the desired dimensions, the output zero signal will be obtained when the probe has been displaced by its engagement with the part by exactly 0.060 inch. If the part is oversize, the output signal will be obtained with less than a 0.060 displacement of the probe, thus causing an output signal to be recorded on the negative side of the recorder's zero reference line. Conversely, if the part is undersized, the probe must be displaced more than 0.060 of an inch before a zero output signal is obtained. This will cause the output to be recorded on the negative side of the zero reference line. This arrangement permits both positive an negative tolerance measurements to be made, through an error range of 0.120 inch. After the tolerance of a given point has been measured and recorded, the tape reader 71 generates a command which removes the probe 67 from the inspection point and redirects it to the next inspection point, after which the operation is repeated. The chart, or the pen, of the recorder 76 advances to the proper position for recording the next measurement. Upon completion of all the inspection points, the probe is returned to the indexing point and the part may be removed from the machine 72.

In the foregoing description it will be seen that the present invention provides a convenient means for inspecting machine parts utilizing, in part, the same apparatus employed in the manufacture of the part. The cutting tool is merely replaced with the inspection probe and the tape reader is provided with an inspection tape in lieu of the tape used in the cutting tool. In a practical construction, measurements may be made to an accuracy of 0.001 inch and a repeatability of ±0.0005 inch.

As will be appreciated by those skilled in the art, various modifications, omissions, and additions may be made to the present invention without departing from the intended scope thereof. Accordingly, it is to be understood that the invention shall be limited only by the following claims.

I claim:

1. An inspection device adapted to be selectively positioned along three orthogonal axes relative to a workpiece for verifying the dimensions thereof, comprising:

a hollow housing;

a stylus shaft having a first terminus extending into said hollow housing and having a second exposed terminus for contacting said workpiece;

means for mounting said shaft for limited movement in three degrees of angular freedom and one degree of rectilinear freedom;

a bearing seat fixed with respect to said housing for supporting said mounting means;

transducer means biased into engagement with said first terminus of said shaft and responsive to displacement thereof to generate an output signal; and a lockout ring encircling said shaft and secured thereto at a location intermediate said second exposed terminus and said mounting means sufficient to allow clearance between said ring and said housing during angular movement of said shaft, said ring having an exterior diameter sufficiently smaller than the interior diameter of said housing to permit said lockout ring to enter the interior of said housing in response to rectilinear movement along the major axis of said shaft.

2. An inspection device as defined in claim 1 including means for mounting said housing in a receiving collet.

3. An inspection device as defined in claim 1 including spring means for normally urging said stylus shaft into a position intermediate of the limits imposed on the angular movement of said shaft.

4. An inspection device as defined in claim 1 wherein said transducer means includes a valve operatively responsive to displacement of said cam surface to produce a pneumatic output signal.

5. An inspection device as defined in claim 1 wherein said transducer means includes an electrical pickup operatively responsive to displacement of said cam surface to produce an electrical output signal.

6. A numerically controlled machine having a collet and in combination with an inspection device as defined in claim 1 comprising:

a table for supporting the workpiece to be inspected;

means for imparting relative movement between the table and the collet, the inspection device being mounted in the machine collet with the exposed terminus of the stylus shaft being engageable with the workpiece on the table;

a programmed inspection tape means being coupled with the movement imparting means for controlling the relative movement between the table and the workpiece along a predetermined path; and a recorder coupled to the transducer means of the inspection device for indicating dimensions of the workpiece upon engagement of the workpiece and the inspection device.

7. The invention defined in claim 6 including a limit switch operatively responsive to said output signal to inactivate said movement imparting means in the event that the imposed limits of said shaft are exceeded.

8. An inspection device adapted to be selectively positioned along three orthogonal axes relative to a workpiece for verifying the dimensions thereof, comprising:

an elongated hollow housing;

a stylus shaft having a first convex terminus, the apex of which has a generally conical shape, extending into one end of said hollow housing and having a second exposed terminus for contacting said workpiece;

a spherical bearing fixedly secured to said shaft intermediate the ends thereof whereby said shaft is supported for movement in 3° of angular freedom;

a stationary bearing seat fixed with respect to said housing and having a complementary spherical surface engaging that portion of said spherical bearing which is adjacent said second terminus;

a movable bearing seat slidably mounted within said housing and having a complementary spherical surface engaging that portion of said spherical bearing which is adjacent said first terminus of said shaft thereby permitting both said movable bearing seat and said stylus shaft to be rectilinearly translated along the major axis of said housing in a direction to and away from said stationary bearing seat;

a rectilinearly displaceable translation element slidably mounted within said housing and having a concave cam surface biased directly against said first conical shape terminus of said shaft, said cam surface having a generally complementary concave contour with respect to said conical shape terminus, whereby angular movement in 2° of freedom and rectilinear movement in 1° of freedom of said shaft will rectilinearly displace said translation element along the major axis of said housing;

means connected to said shaft for mechanically inhibiting movement thereof in said 2° of angular freedom whenever said shaft is rectilinearly translated along said major axis in a direction away from said stationary bearing seat; and transducer means operatively connected to said translation element and responsive to displacement thereof to generate an output signal.

9. An inspection device as defined in claim 8 including:

a spring retainer within said housing and secured thereto between said movable bearing seat and said translation element; and a helical spring having a first end engaging said spring retainer and having a second end urged into engagement with said movable bearing seat.

10. An inspection device adapted to be selectively positioned along three orthogonal axes relative to a workpiece for verifying the dimensions thereof, comprising:

an elongated hollow housing;

a stylus shaft having a first terminus extending into one end of said hollow housing and having a second exposed terminus for contacting said workpiece;

bearing means located on said shaft intermediate the ends thereof by means of which said shaft may be supported for movement in 3° of angular freedom;

a stationary bearing seat fixed with respect to said housing and engaging that portion of said bearing means which is adjacent said second terminus;

a movable bearing seat slidably mounted within said housing and engaging that portion of said bearing means which is adjacent said first terminus of said shaft thereby permitting both said movable bearing seat and said stylus shaft to be rectilinearly translated along the major axis of said housing in a direction to and away from said stationary bearing seat;

a translation element slidably mounted within said housing and having a cam surface biased against said first terminus of said shaft whereby angular movement in 2° of freedom and rectilinear movement in 1° of freedom of said shaft will displace said translation element along the major axis of said housing;

a lockout ring encircling said shaft and secured thereto at a location intermediate said second exposed terminus and said bearing means sufficient to allow clearance between said ring and said housing upon displacement of said shaft about the axis of said bearing means, said ring having an exterior diameter sufficiently smaller than the interior diameter of said housing to permit said lockout ring to enter the interior of said housing in response to displacement along the major axis of said shaft; and transducer means operatively connected to said translation element and responsive to displacement thereof to generate an output signal.

11. The inspective device defined in claim 8 wherein said transducer means comprises a valve operatively responsive to displacement of said translation element to produce a pneumatic output signal.

12. An inspection device as defined in claim 8 wherein said transducer means comprises an electrical pickup operatively responsive to displacement of said translation element to produce an electrical output signal.

13. An inspection device as defined in claim 8 including spring means within said housing for urging said movable bearing seat into engagement with said spherical bearing means.

14. An inspection device as defined in claim 8 including a helical spring normally partially compressed into engagement with said translation element so as to urge said translation element into direct engagement with said first terminus of said shaft.

15. A numerically controlled machine having a collet and in combination with an inspection device as defined in claim 8 comprising:
- a table for supporting the workpiece to be inspected;
- means for imparting relative movement between the table and the collet, the inspection device being mounted in the machine collet with the exposed terminus of the stylus shaft being engageable with the workpiece on the table;
- a programmed inspection tape means being coupled with the movement imparting means for controlling the relative movement between the table and the workpiece along a predetermined path; and
- a recorder coupled to the transducer means for indicating dimensions of the workpiece upon engagement of the workpiece and the inspection device.